T. WHEELER.
POST HOLE BORING APPARATUS.
APPLICATION FILED OCT. 14, 1913.
1,143,872.
Patented June 22, 1915.
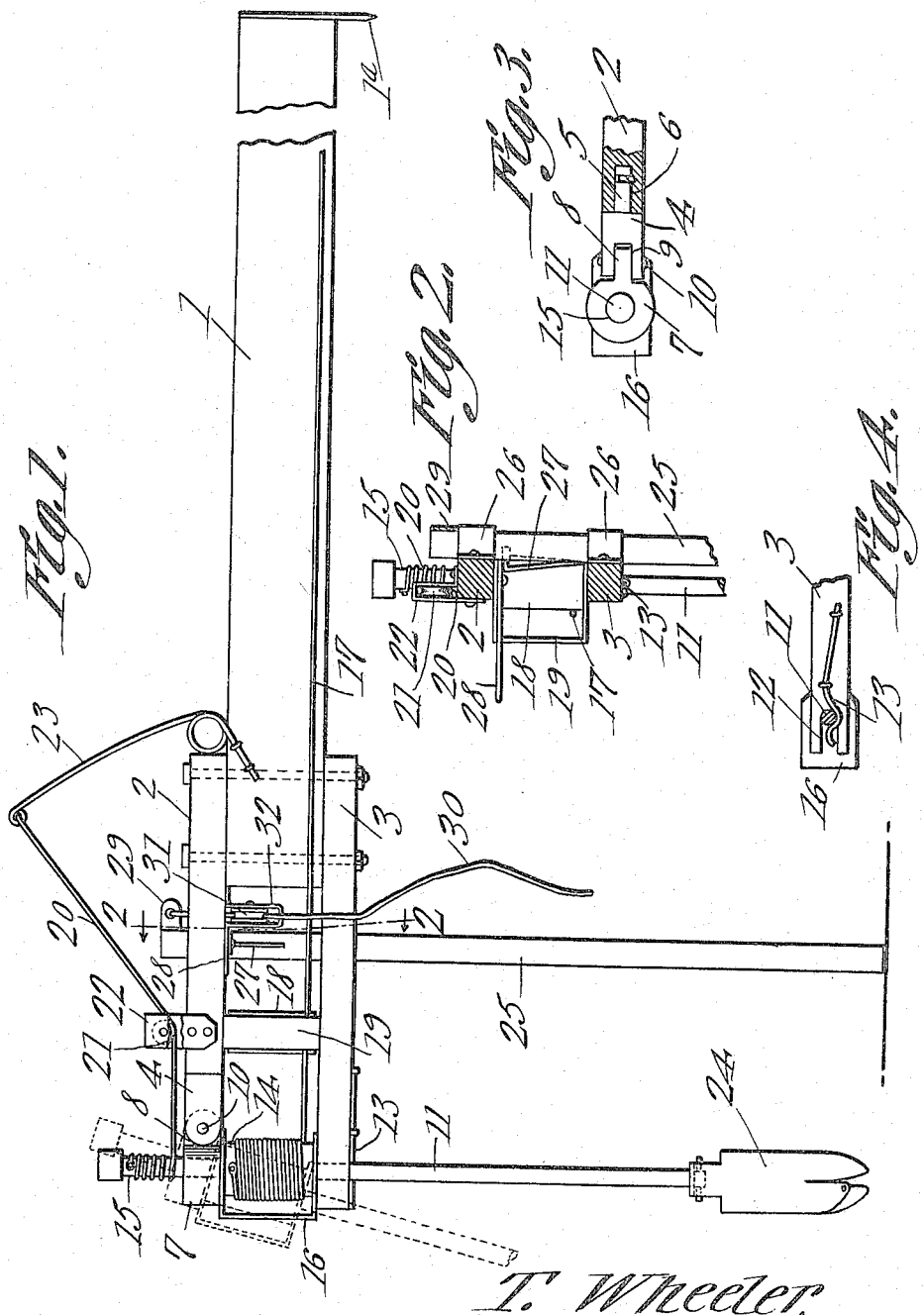

UNITED STATES PATENT OFFICE.

TRAIN WHEELER, OF DOWNING, MISSOURI.

POST-HOLE-BORING APPARATUS.

1,143,872.     Specification of Letters Patent.     Patented June 22, 1915.

Application filed October 14, 1913.   Serial No. 795,130.

*To all whom it may concern:*

Be it known that I, TRAIN WHEELER, a citizen of the United States, residing at Downing, in the county of Schuyler and State of Missouri, have invented a new and useful Post-Hole-Boring Apparatus, of which the following is a specification.

The present invention appertains to a novel and improved post hole boring apparatus, it being the object of the invention to provide means for boring post holes, and the like, in a facile and expeditious manner.

Another object of the present invention is to provide novel means for actuating the auger by horse power, or by means of a prime mover.

A further object of the present invention is to provide novel means for permitting the auger to be lowered and for raising the auger after the hole has been bored.

A still further object of the present invention is to provide a novel mounting for the auger spindle or shaft.

With the foregoing and other objects in view, which will be apparent as the description proceeds, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings.

Figure 1 is a side elevation of the apparatus illustrating the auger in raised position, a portion of the beam and actuating cable or cord being broken away. Fig. 2 is a sectional detail taken on the line 2—2 of Fig. 1. Fig. 3 is a fragmental detail of the mounting of the spindle. Fig. 4 is a fragmental detail of the means for retaining the spindle in normal or active condition.

In carrying out the invention, reference being had in detail to the drawings, there is provided a beam 1 of any suitable length, and which is provided at its rear end with several soil engaging spurs or teeth 1ª, the free end of the beam 1 being adapted to swing vertically to lower and raise the auger hereinafter referred to. To the top and bottom of the beam 1 at its free end, are secured the respective upper and lower bars 2 and 3 which project from the free end of the beam to provide a fork.

The bar or branch 2 of the fork is shorter than the bar or branch 3, a block or member 4 being swiveled to the free end of the bar 2. The block or member 4 is provided with the shank or stem 5 swiveled within the socket 6 provided in the free end of the bar 2, and a spindle bearing 7 is pivoted to the block 4, the bearing being provided with a tongue or tenon 8 pivoted within the slot or mortise 9 provided in the block 4. A suitable pivot pin 10 is passed through the block 4 and the tenon 8 of the bearing 7 to pivot the bearing to the block, as will be apparent.

The spindle shaft 11 is journaled through the bearing 7, and is normally received by an open slot or recess 12 provided in the free end of the bar 3, a spring latch 13 being secured to the bottom of the bar 3 to snap over the spindle 11 to retain it within the slot 12. In this manner, the spindle is journaled to the free ends of the bars or arms 2 and 3, it being observed, however, that the lower end of the spindle may be swung forwardly out of the slot 12 by releasing the latch 13, this action being permitted by the pivotal engagement of the bearing 7 with the block 4. It is also to be noted that the block 4 in being swiveled to the spindle 11 may be swung laterally or sidewise, for convenience in attaching or detaching the auger hereinafter referred to, or for other purposes.

The spindle 11 is provided with a primary drum or spool 14 between the bearing 7 and the lower bar 3, and is further provided with a secondary drum or spool 15 above the bearing 7, the primary and secondary drums being of relatively large and small diameters. A U-shaped guard 16 has its ends embracing the spindle 11 over the ends of the drum 14, the upper end of the guard being secured to the bearing 7 to maintain the guard in its forward position, so as to protect the drum 14 and prevent the cable, hereinafter referred to, from unraveling.

A cable or flexible element 17 is wound upon the drum 14 and extends rearwardly along the beam 1, a roller or rotating guide 18 being journaled between the bars 2 and 3 for guiding the cable 17. A guide 19 of U-shape has its ends secured to the bars 2 and 3 over the ends of the roller 18 to maintain the cable 17 in operative relation with the roller 18. The cable 17 is adapted to extend rearwardly so as to be actuated by any horse power mechanism, or by means of a prime mover of any suitable character. It is designed, however, that the cable 17 shall be drawn rearwardly to rotate the drum 14 and to consequently rotate the auger, so as to properly bore the post hole, the cable being released after this operation so as to be again wound upon the drum 14, as will hereinafter appear.

A cable or cord 20 is wound upon the secondary drum 15 and is trained under a pulley or sheave 21 carried by the housing 22 secured upon the bar 2, the rear or free end of the cable or cord 20 being attached to a spring 23 carried by the beam 1. The spring 23 has a rearward tension tending to unwind the cable or cord 20 from the secondary drum 15, the cables 17 and 20 being wound in reverse directions upon the respective primary and secondary drums. It will thus be noted that the spring 23 in unwinding the cable 20 will wind the cable 17 upon the primary drum, and vice versa, when the main cable is unwound, the cable 20 will be wound upon the secondary drum.

An auger 24 of any suitable character is attached to the lower end of the spindle or shaft 11, so as to rotate with the spindle. This auger 24 is preferably of such a design as to bore out the earth when rotated in one direction, and to liberate itself when rotated in the other direction, in order that when the auger is rotated by the unwinding of the cable 17 from the drum, the auger will effectively bore into the earth.

In order to normally support the beam 1, to permit the beam to be lowered, and to raise the beam after the hole has been bored, a standard or upright 25 is provided, the same having a loose sliding engagement with the beam. To this end, a pair of straps 26 are secured to the respective sides of the bars 2 and 3, the straps embracing the standard 25 loosely, so that the beam may slide or swing upwardly and downwardly upon the standard. The standard 25 is either adapted to rest on the soil or to have its lower end embedded in the soil, the rear end of the beam 1 being extended to a suitable point so that the spur 1ª may engage the soil to permit the free end of the beam to move vertically. A spring catch 27 is carried by the standard 25 adjoining its upper end, and a lever 28 is fulcrumed to the bottom of the upper bar 2. The inner arm or end of the lever 28 is normally adapted to engage over the catch 27. When the lever 28 is swung to one side, the same is adapted to release the catch 27 so as to permit the beam to descend, the straps 26 sliding along the standard. Conversely, when the beam is raised, the spring catch 27 is adapted to snap under the respective end of the lever 28 to support the beam.

As a convenient means for raising the beam, an angular member 29 is secured to the upper end of the standard and has attached thereto a cable or rope 30 which is trained under a pulley 31 carried by a housing 32 depending from the upper bar 2. When the beam 1 is lowered, the same may be readily raised by properly pulling the free end of the cable or rope 30, as will be apparent.

In use, when the auger is positioned over the point where the post hole is to be drilled, the lower end of the standard 25 engaging the soil to support the beam 1, and after the lever 28 is released from the catch 26, the beam will descend so as to bring the auger in engagement with the soil. Then, by drawing the cable 17 rearwardly, by horse power, or a suitable prime mover, as above referred to, the spindle 11 may be properly rotated so that the auger 24 will bore into the earth. When the cable 17 is released, the spring 23 will be brought into play so as to unwind the cable and consequently wind the actuating cable 17 upon the drum 14 for a new operation. After the post hole has been drilled to the proper depth, the beam may be raised by means of the cable or rope 30, as will be obvious so that the apparatus may be moved to a new position.

In the use of the apparatus, it is to be understood that the beam 1 stands in an inclined position, with the spike or spikes 1ª engaging the soil, in order to permit the free end of the beam to swing vertically to properly carry the auger downwardly and then upwardly. The beam 1 is relatively long, in order that the auger may be properly guided into the soil for boring a post hole, or the like, the straps 26 embracing the standard 25 in such a manner as to permit of the proper vertical play of the beam while the standard 25 is supported in an erect or inclined position.

What is claimed is:—

1. In a hole boring apparatus, a supporting structure, an auger spindle journaled thereto having primary and secondary drums, an actuating cable wound upon the primary drum, a spring carried by the said structure, and a cable attached to the spring and wound upon the secondary drum to wind the actuating cable upon the primary drum.

2. In a hole boring apparatus, a beam having a fork at one end, an auger spindle journaled through the arms of the fork, the spindle having a primary drum between the arms of the fork and having a secondary drum of smaller diameter above the fork, an actuating cable extending along the beam and wound upon the primary drum, a spring secured upon the beam, and a cable attached to the spring and wound upon the secondary drum to wind the actuating cable upon the primary drum.

3. In a hole boring apparatus, a supporting structure including a fork, a bearing pivoted to one arm of the fork, an auger spindle journaled through the bearing, the other arm of the fork having a recess to receive the spindle, and means carried by the last mentioned arm for normally maintaining the spindle within the recess.

4. In a hole boring apparatus, a supporting structure including a fork, a block swiveled to one arm of the fork, a bearing pivoted to the block, an auger spindle journaled through the bearing, the other arm of the fork having a recess to receive the spindle, and a latch carried by the last mentioned arm and normally engaging the spindle.

5. In a hole boring apparatus, a supporting structure including a fork, a bearing pivoted to one arm of the fork, an auger spindle journaled through the bearing and having a drum adapted to stand between the said bearing and the other arm of the fork, the last mentioned arm having a recess to receive the spindle, means carried by the last mentioned arm for normally engaging the spindle, and a U-shaped guide having its ends embracing the spindle over the ends of the drum, the respective end of the guard being secured to the bearing.

6. In a hole boring apparatus, a beam, an auger spindle carried thereby, a standard adapted to engage the soil, the beam having means embracing the standard, the standard and beam having coöperating means for normally holding the beam in raised position, and coöperating means carried by the standard and beam for raising the latter.

In testimony that I claim the foregoing as my own, I have hereto affixed my signature in the presence of two witnesses.

TRAIN WHEELER.

Witnesses:
D. E. MORRIS,
H. N. FOGLE.

Copies of this patent may be obtained for five cents each, by addressing the "Commissioner of Patents, Washington, D. C."